(12) United States Patent
Cheng et al.

(10) Patent No.: US 7,076,659 B2
(45) Date of Patent: Jul. 11, 2006

(54) ENHANCED METHOD FOR DIGITAL DATA HIDING

(75) Inventors: Szeming Cheng, College Station, TX (US); Hong Heather Yu, Princeton Jct., NJ (US); Zixiang Xiong, College Station, TX (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 892 days.

(21) Appl. No.: 10/082,551

(22) Filed: Feb. 25, 2002

(65) Prior Publication Data

US 2003/0161550 A1    Aug. 28, 2003

(51) Int. Cl.
*H04B 1/69*   (2006.01)
*H04K 1/06*   (2006.01)
*H04L 9/00*   (2006.01)
*H04N 7/16*   (2006.01)

(52) U.S. Cl. .................. 713/176; 380/38; 380/210; 382/100

(58) Field of Classification Search ................ 713/176; 382/100; 380/38, 210
See application file for complete search history.

(56) References Cited

U.S. PATENT DOCUMENTS

| | | | |
|---|---|---|---|
| 5,073,925 A | 12/1991 | Nagata et al. | 360/60 |
| 5,450,490 A | 9/1995 | Jensen et al. | 380/253 |
| 5,748,783 A | 5/1998 | Rhoads | 382/232 |
| 5,778,102 A | 7/1998 | Sandford, II et al. | 382/251 |
| 5,809,139 A | 9/1998 | Girod et al. | 380/202 |
| 5,848,155 A | 12/1998 | Cox | 382/191 |
| 5,893,067 A | 4/1999 | Bender et al. | 704/52 |
| 5,905,800 A | 5/1999 | Moskowitz et al. | 380/28 |
| 5,915,027 A | 6/1999 | Cox et al. | 380/54 |
| 5,930,369 A | 7/1999 | Cox et al. | 380/54 |
| 6,483,927 B1 * | 11/2002 | Brunk et al. | 382/100 |
| 6,608,911 B1 * | 8/2003 | Lofgren et al. | 382/100 |
| 6,625,297 B1 * | 9/2003 | Bradley | 382/100 |
| 6,650,762 B1 * | 11/2003 | Gibson et al. | 382/100 |
| 6,674,873 B1 * | 1/2004 | Donescu et al. | 382/100 |
| 6,798,893 B1 * | 9/2004 | Tanaka | 382/100 |
| 6,990,213 B1 * | 1/2006 | Donescu | 382/100 |
| 2002/0131617 A1 * | 9/2002 | Pelly et al. | 382/100 |

OTHER PUBLICATIONS

W. Bender, D. Gruhl, N. Morimoto, A. Lu, "Techniques for Data hiding", IBM Systems Journal, vol. 35, Nos. 3&4, 1996.*

(Continued)

*Primary Examiner*—Jacques H. Louis-Jacques
*Assistant Examiner*—Matthew Heneghan
(74) *Attorney, Agent, or Firm*—Harness, Dickey & Pierce, PLC

(57) ABSTRACT

A method is provided for enhanced spread spectrum watermarking. The improved watermarking method includes: receiving host data which is expressed in a transform domain by a plurality of host transform parameters; reducing variance between the plurality of host transform parameters, thereby forming an enhanced sequence of host transform parameters; and adding a watermark to the enhanced sequence of host transform parameters using a spread spectrum technique. The enhanced sequence of host transform parameters may be formed by arranging the plurality of host transform parameters in at least one of an ascending order or descending order; determining a difference for each pair of consecutive host transform parameters; and alternating the sign of every other difference value, thereby forming the enhanced sequence of host transform parameters.

11 Claims, 3 Drawing Sheets

OTHER PUBLICATIONS

H. Kang, J. Choi, S. Lee, S. Cho, "Reliable watermark detection method based on analysis of correlation," Optical Engineering, Dec. 2000, pp. 3308-3316.*

Q. Cheng, T. S. Huang, "An Additive Approach to Transform-Domain Information Hiding and Optimum Detection Structure," IEEE Transactions on Multimedia, vol. 3, pp. 273-284, Sep. 2001.*

E. Koch, J. Zhao, "Towards Robust and Hidden Image Copyright Labeling", In Proc. of 1995 IEEE Workshop on Nonlinear Signal and Image Processing (Neos Marmaras, Greece, Jun. 20-22, 1995).

I.J. Cox, J. Kilian, F.T. Leighton, T. Shamoon, "Secure Spread Spectrum Watermarking for Multimedia", IEEE Transactions on Image Processing, vol. 6, No. 12, Dec. 1997.

I.J. Cox, M.L. Miller, A.L. McKellips, "Watermarking as Communications with Side Information", Proceedings of the IEEE, vol. 87, pp. 1127-1141, Jul. 1999.

F. Hartung, J. K. Su, B. Girod, "Spread Spectrum Watermarking: Malicious Attacks and Counterattacks" Proc. SPIE Security Watermarking of Multimedia Contests 99, San Jose, CA., Jan. 1999.

Q. Cheng, T. S. Huang, An Additive Approach to Transform-Domain Information Hiding and Optimum Detection Structure, IEEE Transactions on Multimedia, vol. 3, pp. 273-284, Sep. 2001.

M. Arnold, S. Kanka, "MP3 Robust Audio Watermarking" DFG VIIDII Watermarking Workshop 1999, Erlangen, Germany.

C. I. Podilchuk, W. Zeng, "Image-Adaptive Watermarking Using Visual Models", IEEE Journal on Selected Areas in Communications, vol. 16, No. 4, May 1998.

F. Hartung, B. Girod, "Watermarking of Uncompressed and Compressed Video", vol. 66, No. 3, May 1998, pp. 283-301.

M. D. Swanson, B. Zhu, A.H. Tewfik, "Robust Data Hiding for Images", Proc. 1996 IEEE Digital Signal Processing Workshop.

L. Boney, A. H. Tewfik, K.N. Hamdy, "Digital Watermarks for Audio Signals", 1996 IEEE Proceedings of Multimedia.

P. Bassia, I. Pitas, "Robust Audio Watermarking in the Time Domain", Thessaloniki 540 06, Greece.

M. Arnold, S. Kanka, "MP3 Robust Audio Watermarking", Department for Security Technology for Graphics and Communication Systems.

C. Neubauer, J. Herre, "Audio Watermarking of MPEG-2 AAC Bit Streams", AES 108th Convention, Paris Feb. 12-22, 2000.

* cited by examiner

ENHANCED METHOD FOR DIGITAL DATA HIDING

FIELD OF THE INVENTION

The present invention relates generally to media data hiding, and more particularly, to a method for enhancing spread spectrum watermarking.

BACKGROUND OF THE INVENTION

The proliferation of digitized media is creating a pressing need for techniques that protect copyright owners. Watermarking is a known technique for protecting copyright owners. Watermarking is a process of hiding information in digitized media for purposes of ownership verification and content protection. As expected, introduction of distortion into the host data during watermark embedding is unavoidable; nevertheless, it is usually favorable to have host data that is perceptually indistinguishable from its original form after embedding the watermark.

One well known watermarking technique is based on spread spectrum communications. In spread spectrum communications, a narrowband signal is transmitted across a wider carrier frequency band such that the signal energy present in any single frequency is undetectable. Similarly, a watermark may be embedded in host media data by spreading the embedded data over a large frequency band. Spread spectrum watermark is designed to be difficult (preferably virtually impossible) to remove from the host signal without rendering the host signal useless for its intended purposes and without imposing any perceptual artifacts introduced by the inserted watermark.

In an article by Ingemar J. Cox et al., entitled "Secured Spectrum Watermarking for Multimedia" in IEEE Transactions on Image Processing, Vol. 6, No. 12, December 1997, as well as U.S. Pat. No. 5,930,369 by Cox et al, entitled "Secure spread spectrum watermarking for multimedia data", spread spectrum watermarking is described which embeds a pseudo-random noise sequence into digital data for watermarking purposes. Extraction of watermark requires the availability of the original image. In U.S. Pat. No. 5,848,155 by Cox et al, entitled "Spread spectrum watermark for embedded signaling", the watermark is extracted from watermarked data without the use of an original or unwatermarked version of the data. This approach overcomes the limitations of the prior systems by using spread spectrum technology to embed watermark data or information into predetermined locations in an image.

SUMMARY OF THE INVENTION

In accordance with the present invention, an improved method is provided for spread spectrum watermarking. The improved watermarking method includes: receiving host data which is expressed in a transform domain by a plurality of host transform parameters; reducing variance between the plurality of host transform parameters, thereby forming an enhanced sequence of host transform parameters; and adding a watermark to the enhanced sequence of host transform parameters using a spread spectrum technique. The enhanced sequence of host transform parameters may be formed by sorting the plurality of host transform parameters in at least one of an ascending order or descending order; determining a difference for each pair of consecutive host transform parameters, and alternating the sign of every other difference value, thereby forming the enhanced sequence of host transform parameters. The present invention is applicable to the watermarking of various types of digital data stream, such as audio, image video, software and multimedia.

For a more complete understanding of the invention, its objects and advantages, reference may be had to the following specification and to the accompanying drawings.

DETAILED DESCRIPTION OF THE PREFERRED EMBODIMENTS

Spread spectrum watermarking is a well known technique for embedding watermark data into digitized media. Further explanation of this technique may be found in technical resources, including an article by Ingemar J. Cox et al entitled "Secure Spread Spectrum Watermarking for Multimedia" in IEEE Transactions on Image Processing, Vol. 6, No. 12, December 1997 which is incorporated by reference herein. However, a mathematical description of spread spectrum watermarking is provided below as a basis for understanding the present invention.

Assume that we are going to embed a single bit $b \in \{1,-1\}$ into a host signal sequence $x = x_1, x_2, \ldots, x_N$. Further assume that $k = k_1, k_2, \ldots, k_N$ is the watermark key which is randomly selected but known to the watermark detector, where $k_i \in \{1,-1\}, 1 \leq i \leq N$ and that each individual sample of the key is zero mean and independent to each other. Let $\Delta = \Delta_1, \Delta_2, \ldots, \Delta_N$ be the scaling sequence that determines the amount of distortion added to the host sequence, where $\Delta_i \geq 0, 1 \leq i \leq N$, and finally the watermarked signal is $x' = x_1', x_2', \ldots, x_N'$, where $x_i' = x_i + b\Delta_i k_i, 1 \leq i \leq N$.

To decode the watermark, we start with $\hat{x}_i = x_i' + n_i$, which is a noisy version of $x_i'$, where $n = n_1, n_2, \ldots, n_N$ is some additive noise sequence introduced in the watermarked signal processing, transformation, or intentional watermark attacks. Define $$D = \frac{1}{N}\sum_{i=1}^{N} k_i \hat{x}_i,$$

then an estimate of the embedded information $\hat{b}$ can be formed as $\hat{b} = \text{sign}(D)$.

If we assume that x, k, $\Delta$, and n are independent to each other and that $$E[\Delta_i] = E[\Delta], 1 \leq i \leq N,$$

$$\text{then } \bar{D} = E[D] = E\left[\frac{1}{N}\sum_{i=1}^{N} k_i(x_i + b\Delta_i k_i + n_i)\right] = bE[\Delta],$$

$$\text{and } \sigma_D^2 = E\left[(D - \bar{D})^2\right] = E\left[\frac{1}{N}\sum_{i=1}^{N} k_i(x_i + n_i)\frac{1}{N}\sum_{j=1}^{N} k_j(x_j + n_j)\right] =$$

-continued $$\frac{1}{N^2}\sum_{i=1}^{N}\sum_{j=1}^{N}E[k_ik_j]E[x(x_i+n_i)(x_j+n_j)] = \frac{\sigma_x^2+\sigma_n^2}{N}.$$

Since $\bar{D}=bE[\Delta]$ and $E[\Delta]$ is positive, $\hat{b}=\text{sign}(\bar{D})$ indeed gives an appropriate estimate of b. Furthermore, the larger the value of $$\left|\frac{\bar{D}}{\sigma_D}\right|,$$

the more certain the estimate will be. In the absence of noise, $$\left|\frac{\bar{D}}{\sigma_D}\right| = \left|\frac{E[\Delta]\sqrt{N}}{\sigma_x}\right| \alpha \frac{1}{\sigma_x}.$$

In the presence of noise $$h\left|\frac{\bar{D}}{\sigma_D}\right| = \left|\frac{E[\Delta]\sqrt{N}}{\sigma_x^2+\sigma_n^2}\right|,$$

which is also proportional to $1/\sigma_x$. Hence, the smaller the host signal variance, the more accurate the abstraction of watermark, the more robust the watermarking scheme.

Figure 1:
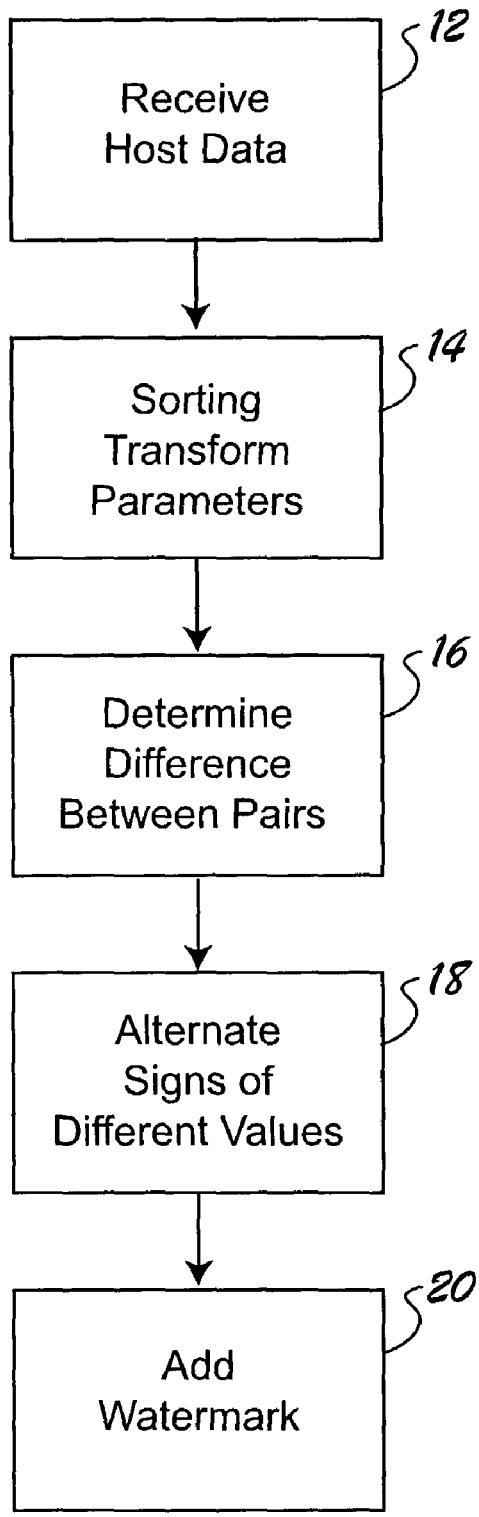
FIG. 1 is a flowchart of a method for enhanced spread spectrum watermarking in accordance with the present invention.

FIG. 1 illustrates a method for enhancing spread spectrum watermarking of digitized media by reducing the variance of the host signal prior to adding the watermark. The host signal is commonly expressed in a transform domain by a plurality of host transform parameters. Although the frequency domain is presently preferred, it is envisioned that the present invention is also applicable to host data expressed in other spectral domains (e.g. cepstrum domain).

Upon receiving the host signal at step 12, the host transform parameters (e.g. frequency coefficients) may be sorted in an ascending at step 14 to obtain $x_{s_1} \leq x_{s_2} \leq x_{s_3} \ldots \leq x_{s_N}$. It is to be understood that the host transform parameters may also be sorted in a descending order.

Next, an enhanced sequence of host transform parameters is formed by determining the difference for each pair of consecutive host transform parameters at step 16, and then alternating the sign of every other difference value at step 18. In other words, the enhanced sequence $y=y_1, y_2, \ldots, y_{N/2}$, is derived in accordance with $y_j=(-1)^j(x_{s_{2j-1}}-x_{s_{2j}}), 1 \leq j \leq N/2$ (assuming N is even). To ensure that y has an approximately zero mean, we explicitly make the two consecutive $y_j$'s have alternative signs. Without the sign alternation, one skilled in the art will note that y will be the high pass band of the Haar wavelet transform of the sorted version of x. Since neighboring samples in the sorted sequence of host transform parameters are close in value, it is expected that the sample values of y will be much smaller than those of x. Hence, $\sigma_x >> \sigma_y$, in general. It is to be understood that there are many other ways to modify $Xs_{2n-1}$ and $Xs_{2n}$ to get $y_n'$. In each application, it is desirable to adjust $Xs_{2n-1}$ and $Xs_{2n}$ in the way that minimizes perceptual alteration introduced via watermark embedding and preserves the order of $Xs_{2n-1}$ and $Xs_{2n}$. For instance, a perceptual model, such as the JND (Just Noticeable Difference) function used in JPEG compression, may be used to guide it.

Lastly, a watermark is added to the enhanced sequence of host transform parameters at step 20 using well known spread spectrum techniques. For example, let the watermark key be $k=k_1,k_2,\ldots,k_{N/2}$, $k_i\epsilon\{-1,1\}$, and the embedding bit be b. That is, $y_n'=y_n+bk_n\Delta_n$. One skilled in the art will readily recognize that this technique may be extended to embed a plurality of bits into the host signal. As in ordinary spread spectrum technique, $\Delta_n$ controls the amount of distortion that can be added to $y_n$ which should be guided by perceptual model if the host media data is perceptual data. Since $y_n=(-1)^n(x_{s_{2n-1}}-x_{s_{2n}})$, the perturbation $bk_n\Delta_n$ can be achieved by applying the distortion to either $x_{s_{2n-1}}$ or $x_{s_{2n}}$ or both. This extra flexibility is useful because $x_{s_{2n-1}}$ and $x_{s_{2n}}$ may have unequal susceptibility to noise. For simplicity, we split the distortion evenly between the pair. Thus we get $y_n'=y_n+bk_n\Delta_n$ as desired, if we construct $$x'_{s_{2j}} = x_{s_{2j}} - (-1)^j bk_j \frac{\Delta_n}{2}$$

$$x'_{s_{2j-1}} = x_{s_{2j-1}} + (-1)^j bk_j \frac{\Delta_n}{2}.$$

To decode the watermark, we first form an estimate $\hat{y}=\hat{y}_1,\hat{y}_2,\ldots,\hat{y}_{N/2}$ with the help of the sorting indices $s_1,s_2,\ldots,s_N$. The embedded bit $\hat{b}$ is then the sign of $\sum_{n=1}^{N/2}k_n\hat{y}_n$, as in an ordinary spread spectrum watermark. During decoding, it is understood that the sorting indices and the watermark key are required. Instead of transferring them separately, it is envisioned that the sorting indices and the watermark can be combined into a single signal dependent key which is in turn transmitted to the decoder.

Compression and transcoding of digital media are often needed for various applications, including delivery through a different communication channel of different bandwidth and use in different devices. For example, an audio is compressed using MPEG II AAC schemes or a compressed audio in MPEG II AAC format is transcoded to MPEG I layer 3, MP3, format. Such reconstruction of the media signal via compression or transcoding can be lossy. In general, this does not alter the signal perceptibility. In many applications, it is often desirable that the embedded watermark survives such lossy reconstruction as well as other types of lossy signal processing and it should remain detectable within the reconstructed media signal.

Figure 2A:
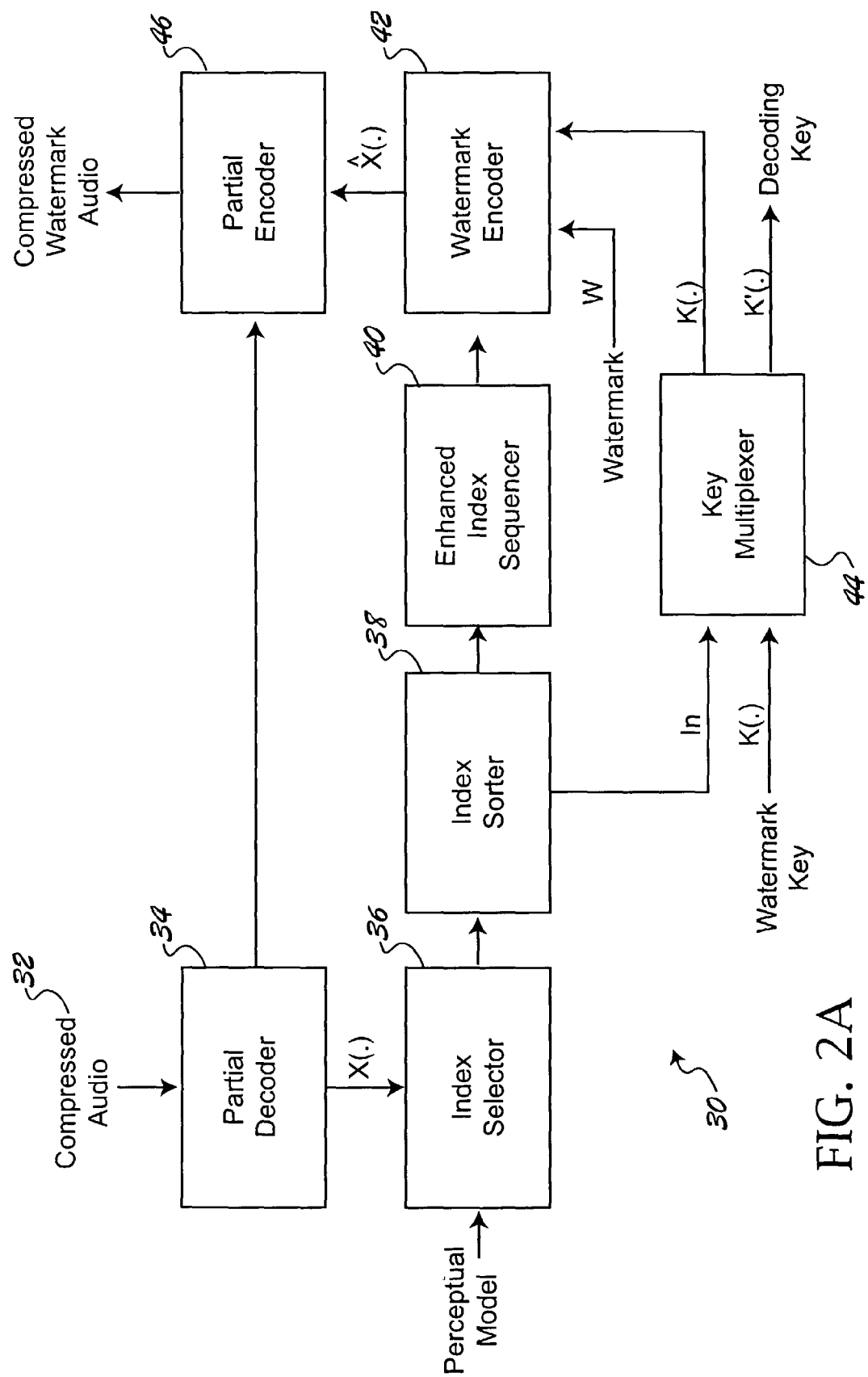
FIGS. 2A and 2B are block diagrams of an exemplary audio encoder and audio decoder, respectively, in accordance with the present invention.

FIG. 2A illustrates how the enhanced spread spectrum watermarking technique of the present invention may be applied to a compressed audio signal. For illustration purposes, the compressed audio data is compressed in accordance with the well known Advanced Audio Coding (AAC) compression standard. While the following description is provided with reference to compressed audio data, it is readily understood that the present invention is applicable to other types of media data and other types of digital data streams, including image data, video data, multimedia data and software data.

In the exemplary encoder 30, the compressed audio data 32 is input into a partial decoder 34. The partial decoder is in turn operable to partially decode the compressed data to recover a plurality of quantization indices. Rather than embed a watermark into frequency coefficients, the watermark will be embedded into the quantization indices. Since no dequantization or requantization is necessary, this approach increases the speed of the overall process. However, it is envisioned that embedding a watermark into the frequency coefficients is also within the scope of the present invention.

The quantization indices from the compressed audio data are then input into an index selector 36. The index selector 36 applies perceptual modeling to estimate the maximum amount of distortion that can be withstood by each quantization index. Perceptual modeling is generally known to those in the art. However, perceptual modeling information is not easily accessible from compressed audio, and thus a heuristic approach may be used to apply perceptual modeling to quantization indices. Further implementation details for an exemplary heuristic approach are disclosed in U.S. patent application entitled "Method and Apparatus for Embedding Data in Compressed Audio Data Stream" filed on Feb. 25, 2002 by the assignee of the present invention which is incorporated herein by reference. In any event, selected quantization indices are output by the index selector 36.

Prior to adding a watermark, the selected quantization indices may be enhanced as described above. To do so, the selected quantization indices are sorted in either of an ascending order or descending order by the index sorter 38. The sorted quantization indices then serve as an input to an enhanced index sequencer 40. The enhanced index sequencer 40 computes a difference for each pair of consecutive quantization indices, and alternates the sign of every other quantization index, thereby forming an enhanced sequence of quantization indices.

A watermark encoder 42 adds a watermark to the enhanced sequence of quantization indices using well known spread spectrum techniques. In addition to the enhanced sequence of quantization indices, the watermark encoder 40 receives as input watermark data and watermark key data. Lastly, the watermarked quantization indices are compressed with a Hoffman coding by a partial encoder 46 to form a compressed watermarked audio signal.

Figure 2B:
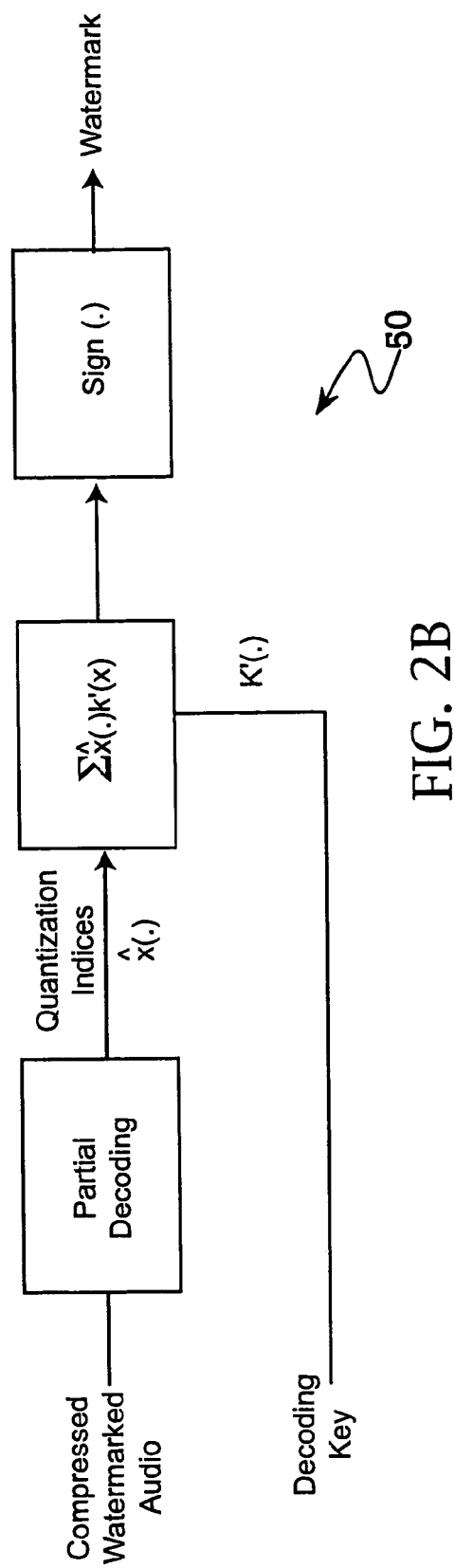

The exemplary audio encoder 30 may optionally include a key multiplexer 44. As noted above, the decoding process requires the watermark key as well as the sorting indices from the index sorter 38. The key multiplexer 44 combines watermark key with the sorting indices to form a single decoding key. A corresponding audio decoder 50 is depicted in FIG. 2B.

The foregoing discloses and describes merely exemplary embodiments of the present invention. One skilled in the art will readily recognize from such discussion, and from accompanying drawings and claims, that various changes, modifications, and variations can be made therein without departing from the spirit and scope of the present invention.

The invention claimed is:

1. A method for enhancing spread spectrum watermarking of digitized media, comprising:
   receiving host data which is expressed in a transform domain by a plurality of host transform parameters;
   arranging the plurality of host transform parameters in at least one of an ascending order or descending order;
   determining a difference for each pair of consecutive host transform parameters, thereby forming a plurality of difference values;
   alternating the sign of every other difference value in the plurality of difference values, thereby forming an enhanced sequence of host transform parameters; and
   adding a watermark to the enhanced sequence of host transform parameters using a spread spectrum technique.

2. The method of claim 1 wherein the step of adding a watermark further comprises:
   receiving watermark data which is expressed in a transform domain by a plurality of watermark transform parameters;
   applying a pseudo random number sequence to the plurality of watermark transform parameters; and
   combining the plurality of watermark transform parameters with the difference values in the enhanced sequence of host transform parameters, thereby deriving watermarked host data.

3. The method of claim 1 wherein the host data is selected from a group consisting of audio data, image data, video data, software data, and multimedia data.

4. The method of claim 1 wherein the transform domain is selected from a group consisting of fast fourier transform, discrete cosine transform (DCT), modulated discrete cosine transform, and discrete wavelet transform.

5. A method for enhancing spread spectrum watermarking of digitized media, comprising:
   transforming host media data from a spatial domain to a frequency domain, thereby forming a plurality of host frequency coefficients indicative of the host data;
   sorting the plurality of host frequency coefficients in at least one of an ascending order or a descending order;
   determining a difference for each pair of consecutive host frequency coefficients, thereby forming a plurality of difference values;
   alternating the sign of every other difference value in the plurality of difference values, thereby forming an enhanced sequence of frequency coefficients; and
   adding a watermark to the enhanced sequence of frequency coefficients using a spread spectrum technique.

6. The method of claim 5 wherein the host media data is segmented from the digitized media.

7. The method of claim 5 wherein the host data is selected from a group consisting of audio data, image data, video data, software data, and multimedia data.

8. The method of claim 5 wherein the step of transforming host media data further comprises using at least one of a fast fourier transform, a discrete cosine transform (DCT), a modulated discrete cosine transform, or a discrete wavelet transform.

9. The method of claim 5 further comprises quantizing the plurality of frequency coefficients prior to the step of sorting.

10. The method of claim 5 wherein the step of adding a watermark further comprises:
   receiving watermark data which is expressed in a frequency domain by a plurality of watermark frequency coefficients;
   applying a pseudo random number sequence to the plurality of watermark frequency coefficients; and
   combining the plurality of watermark frequency coefficients with the enhanced sequence of frequency coefficients, thereby deriving watermarked host data.

11. A method for enhancing spread spectrum watermarking of media data, comprising:
   receiving compressed media data;
   decoding the compressed media data to recover a plurality of quantization indices indicative of the media data;
   sorting the plurality of quantization indices in at least one of an ascending order or a descending order;
   determining a difference for each pair of consecutive quantization indices, thereby forming a plurality of difference values;
   alternating the sign of every other difference value in the plurality of difference values, thereby forming an enhanced sequence of quantization indices; and
   adding a watermark to the enhanced sequence of quantization indices using a spread spectrum technique.

* * * * *